United States Patent [19]

Anstey et al.

[11] Patent Number: 4,633,659
[45] Date of Patent: Jan. 6, 1987

[54] CYLINDRICAL BALE-FORMING PRESS

[75] Inventors: Henry D. Anstey, Ottumwa, Iowa; Jean Viaud, Sarreguemines, France

[73] Assignee: Deere & Company, Moline, Ill.

[21] Appl. No.: 695,319

[22] Filed: Jan. 28, 1985

[30] Foreign Application Priority Data

Jan. 27, 1984 [EP] European Pat. Off. ............ 84400188

[51] Int. Cl.⁴ ............................................. A01D 39/00
[52] U.S. Cl. .......................................... 56/341; 100/88
[58] Field of Search ............ 56/341, 342, 343, DIG. 1; 100/83, 87, 88, 89

[56] References Cited

U.S. PATENT DOCUMENTS

| 4,009,653 | 3/1977 | Sacht | 56/341 |
| 4,224,867 | 9/1980 | Gaeddert et al. | 100/88 |
| 4,228,638 | 10/1980 | Rabe et al. | 56/341 |
| 4,257,219 | 3/1981 | Burrough et al. | 56/341 |

FOREIGN PATENT DOCUMENTS 952156 8/1982 U.S.S.R. ................. 56/341

Primary Examiner—Gene Mancene
Assistant Examiner—John G. Weiss

[57] ABSTRACT

This press for forming cylindrical or round bales comprises sets of bands or belts which, in a conventional manner, define a chamber for forming a bale by rolling up, as well as a pickup designed to transfer harvest products gathered on the ground as far as a bale-forming chamber through an entry opening for the products, and a starting roller located on that side of the opening that is remote from the pickup. According to the invention, a scraper is arranged to cooperate with the starting roller in such a manner as to resist any rolling up of the harvest products around the roller. If the roller is a smooth circular section roller, the scraper may be stationary. It may be arranged in conjunction with fingers extending between the bands or belts as far as to the immediate vicinity of the starting roller on the side of the roller remote from the scraper. In the case of a noncircular starting roller, the scraper is mounted so as to be movable, especially pivotable. It may be resiliently urged towards the starting roller, or else be positively displaced by a driving mechanism.

6 Claims, 3 Drawing Figures

CYLINDRICAL BALE-FORMING PRESS

BACKGROUND OF THE INVENTION

The present invention is concerned with presses for forming cylindrical or round bales.

These presses are of a well-known general type comprising sets of bands or belts which, by their displacement, form by rolling up inside a chamber formed in the body of the press a bale of generally cylindrical shape from harvest products, particularly forage or hay, gathered on the ground while the press is advancing. When the bale has attained the desired diameter and has been bound, the rear gate of the press is opened and the bale is ejected onto the ground. The formation of another bale by rolling up can then be commenced inside the press.

The products that are to form the bale are gathered on the ground by means of a pickup. They are transferred by the latter into the chamber of the press between the runs of the bands or belts which at the commencement of the operation occupy positions closely adjacent each other. Due to this close together positioning and to the displacement in opposite directions of the said runs of the bands or belts, the products gathered at the beginning of the formation of a bale tend to become rolled up and to form the core of a new bale, the diameter of which will progressively increase, the runs of the bands or belts moving apart from each other in accordance with this increase in the diameter of the bale. These bands or belts are then maintained under tension by tensioning rollers which are themselves subject to the action of springs or hydraulic cylinders.

In order to assist the commencement of the formation of the bale, there is provided in known manner, near the front part of the gap or opening for the entry of the products into the chamber of the press, a roller which will be termed a starting roller, near a stationary roller of the press over which the bands or belts pass and which normally serves as a driving roller.

In the case of certain harvest products, especially products which will eventually be made into forage, for example ryegrass, and especially in damp conditions, difficulties arise due to the fact that these products have a tendency to become rolled up around the conventional starting roller, which hinders the formation of a correct bale core and is besides a cause of the formation of tightly packed lumps of material which can bring about the stopping of the press and which consequently slow down the working tempo.

The object of the invention is to cure this disadvantage of the existing presses.

SUMMARY OF THE INVENTION

According to the present invention there is provided a scraper arranged to cooperate with a starting roller of a press for forming round bales in such a manner as to oppose any rolling up of the harvest products around the said roller.

An object of the invention, if the starting roller is a smooth circular-section roller, is to provide a stationary scraper mounted on the frame of the press in the immediate vicinity of the said roller.

A further object of the invention is to provide in combination with a scraper, fingers located between the bands or belts, mounted on the frame of the press, extending close to the lower driving roller of the bands or belts and the ends of which extend as far as to the immediate vicinity of the starting roller. In this case, the said fingers are preferably located above the said starting roller and the scraper is mounted below the latter. There is thus obtained, by the combined action of the fingers and the above-mentioned scraper, a guiding or orienting action on the harvest products which favors the commencement of the rolling up of these products to form a bale core and which reliably prevents any rolling up of these products around the starting roller.

Another object of the invention, in the case of a starting roller of noncircular, for example, square section, is to provide a scraper which is pivotally mounted on the frame of the press in a position close to the starting roller. This scraper may, if desired, be urged towards the starting roller merely resiliently, or else it may have the form of a two-armed lever, one arm of which extends to the vicinity of the starting roller, while the other arm, which is oriented with respect to the pivotal mounting point in the direction away from the roller, is connected to a driving mechanism which subjects the scraper to a pivotal movement in synchronism with the rotation of the starting roller of noncircular cross section. The means which bring about this pivotal movement of the scraper may be constituted, for example, by a crank system, a cam system or an eccentric system.

These and other objects, features and advantages of the present invention will become apparent to those skilled in the art from the description which follows and from the drawings.

DESCRIPTION OF THE PREFERRED EMBODIMENT

Figure 1:
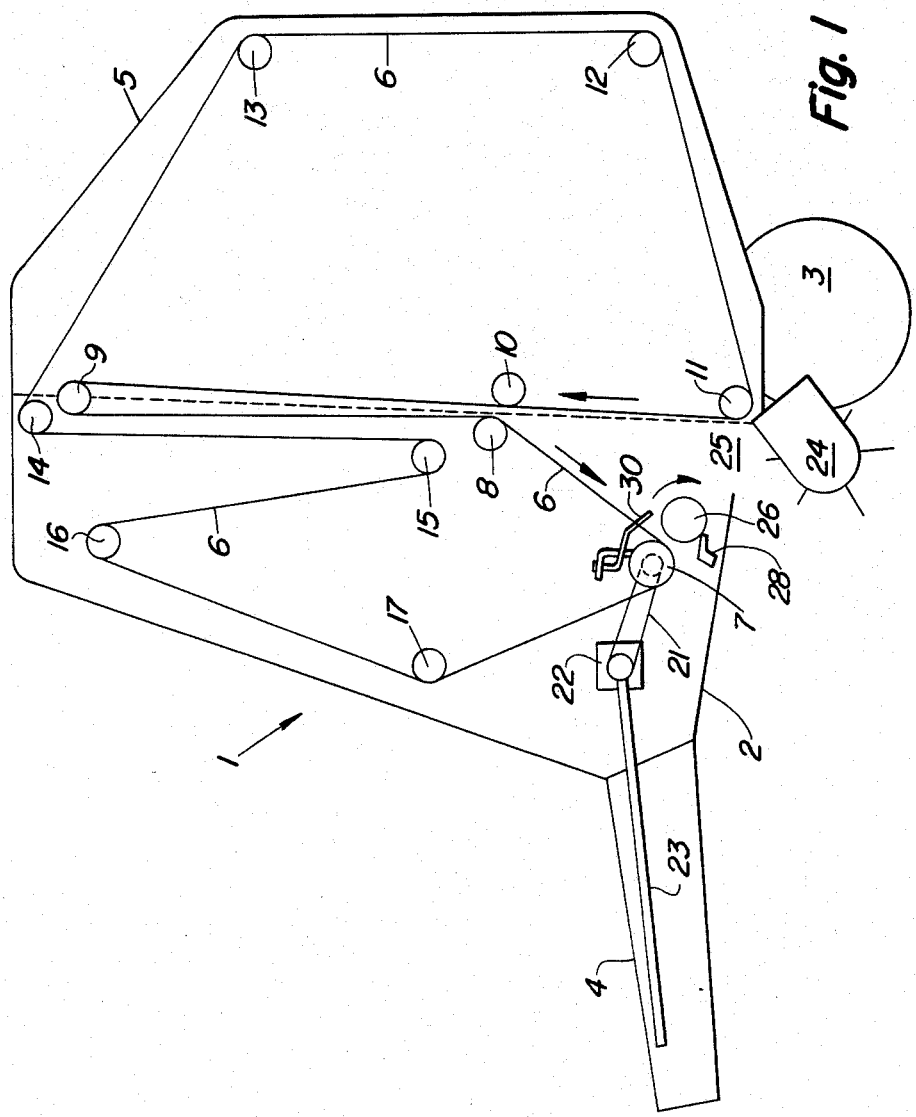
FIG. 1 is a schematic side view of a cylindrical bale-forming press with a starting roller, provided with a scraper and with fingers associated with the said roller.

In the drawings, there has been indicated by the reference 1 a cylindrical bale-forming press of the general conventional type, comprising a front fixed frame indicated diagrammatically at 2 and supported by wheels 3, this frame itself carrying a tow bar 4 designed to be coupled to a tractor, for example. On the front fixed part 2 that forms the frame, there is pivotally mounted in the usual way a rear gate, indicated generally at 5, which can pivot on the front part about its upper horizontal transverse axis (not shown), the opening and closing of this gate being controlled in a manner which is conventional per se by hydraulic jacks or equivalent means (likewise not shown).

A plurality or set of belts 6 is provided on the press. This set comprises, in the usual way, a certain number of parallel belts which are distributed over the width of the press and pass over guide rollers 7-17. Some of these guide rollers are mounted on the front fixed part 2 of the frame, while others are supported by the rear gate 5. In the case of the embodiment shown, the bands or belts 6 completely delimit the rolling-up chamber and consequently only one set of belts is provided. It is obvious, however, that the invention is also applicable in the case of cylindrical bale-forming press having one set of belts on the front part of the press and a second set of belts on the rear part or gate. Some of the guide rollers are supported in a conventional manner on the ends of arms which are themselves pivotally mounted and which are subjected in the usual way to the action of springs or hydraulic cylinders in order to ensure that the belts of the press are maintained under tension.

The guide roller 7 is a driving roller which drives the bands or belts. It is itself driven by a belt or chain drive 21 from an intermediate gearbox 22 which is in turn driven by the transmission shaft 23 drivably connected to the power takeoff shaft of the tractor. It would be possible instead to provide a transmission between the roller 7 and another intermediate roller, for example, the upper roller, in order to divide the drive of the bands or belts between the driving rollers.

There has been indicated at 24 in the lower part of the press a pickup which serves for gathering windrowed harvest products from the ground and introducing them into the chamber of the press through a gap or opening, indicted at 25, located at the bottom of the chamber between the rollers 7 and 11 for the entry of the products. The pickup delivers crop into the gap 25 in a zone near the roller 11 and adjacent the roller 7 there is provided in a manner know per se a startin roller 26.

At the commencement of the bale-forming operation in the interior of the press, the runs of the belts that delimit the rolling-up chamber of the press are very close to each other. The products gathered by the pickup 24 enter between the said runs of the belts through the gap 25. They have a tendency to become rolled up on themselves and this rolling up is favored by the presence of the starting roller 26 which is positively driven by means (not shown) from the driving roller 7.

Nevertheless, as indicated previously, for certain harvest products, especially forages such as very wet ryegrass, difficulties can arise due to the tendency of these harvest products to become rolled up around the starting roller. This may result in the formation of tightly packed lumps which cause the press to stop.

Figure 2:
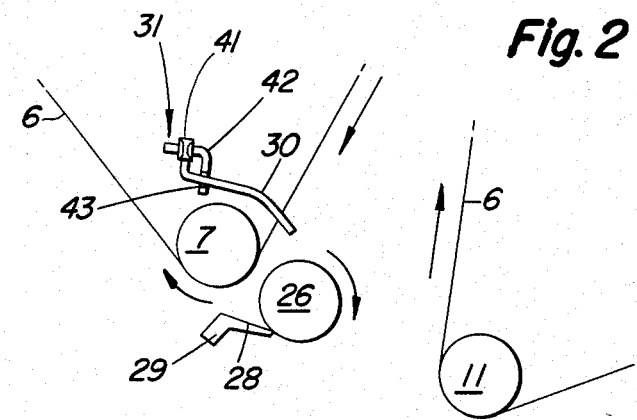
FIG. 2 is a partial view on a larger scale showing one possible embodiment of the invention.

Reference will now be had to FIG. 2 which shows one embodiment of the invention.

In this FIG. 2, which is a partial view, the guide roller for the bands or belts is shown at 7, the starting roller at 26 and the guide roller, which is close to the upper part of the pickup 24 and which together with the starting roller 26 delimits the opening 25 through which the harvest products enter the interior of the rolling-up chamber of the press, at 11.

According to the invention, there is provided close to the starting roller 26, in the present case below the latter, a stationary scraper 28 which is mounted on the front part 2 of the frame of the press. The fixing of this scraper to the frame may be effected in any desired manner, for example by bolting of a heel portion 29 of the scraper to the frame. It can be seen from FIG. 2 that this scraper extends as far as to the immediate vicinity of the periphery of the starting roller 26 which in the present case is smooth.

According to another special characteristic of the invention which is also apparent from FIG. 2, there are provided on the front part 2 of the frame of the press, between the bands or belts 6, fingers 30 which are mounted on the said frame by their rear parts at 31. These fingers 30 extend in the present case over the guide roller or driving roller 7 and as far as to the proximity of the upper part of the starting roller 26. They are provided at the rear with a part which forms a pivotal axis 41 supported by a stationary angle section 42 extending transversely of the press, and they extend through slots 43 provided in one limb of this angle section, which slots restrict their range of movement. This form of mounting enables the fingers to adapt themselves to possible lateral displacements of the belts 6 while the press is operating.

The investigations that have resulted in the invention have shown that, in practice, this combination of the scraper 28 and the fingers 30 reliably prevents any prejudicial rolling up of the harvest products around the starting roller even if they are very damp, thereby consequently favoring the formation of a bale core and thus remedying the disadvantages of the prior technique.

Figure 3:
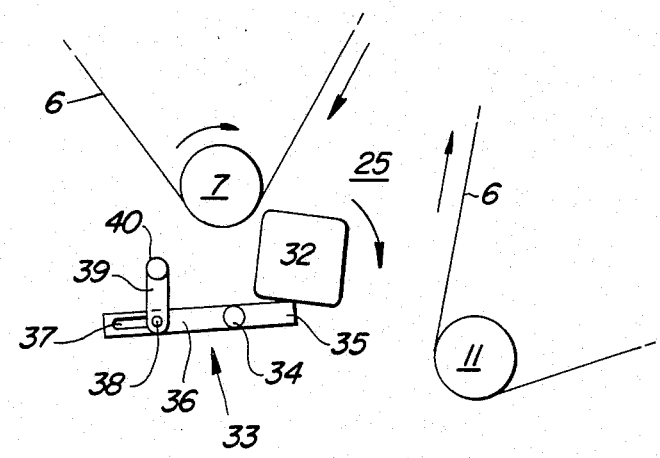
FIG. 3 is a view similar to FIG. 2, but showing a constructional variant.

In FIG. 3 there has been shown a constructional variant of the invention. In this case once again, the guide roller or driving roller of the bands or belts 6 has been indicated at 7, the roller located above the pickup 24 at 27 and the opening for the entry of the harvest products into the bale-forming chamber of the press at 25.

According to this constructional form, the starting roller is constituted by a roller 32 of square section. This section could however be different, for example, hexagonal, or could have any other desired shape.

Since the section of the starting roller diverges in the present case from a circular section and having regard to the fact that the effectiveness of the scraper is bound up with the positioning thereof in the immediate vicinity of the periphery of the said starting roller, the said scraper is constituted in the present case by a two-armed lever 33 which is pivotally mounted at 34 on the front part 2 of the frame of the press. As shown, the front end 35 of the scraper is located in this case also in the immediate vicinity of the periphery of the starting roller 32. According to the constructional form that is under consideration, the rear part 36 of the scraper is provided with a slot 37 in which is engaged a finger 38 mounted on a crank arm 39 which rotates about the axis of a shaft 40. The drive thereof is a positive drive which is obtained by means (not shown), the movement being transmitted, for example, from the guide roller or driving roller 7.

Thus, if it is ensured that the shaft or axle 40 is driven at a speed which, in the case of a polygonal starting roller 32, is a multiple of the speed of rotation of the said starting roller 32 corresponding to the number of surfaces of the latter, there is obtained a pivoting movement of the scraper 33, the end 35 of which perfectly follows the periphery of the starting roller 32 and remains in the immediate vicinity thereof.

Here again, detrimental rolling up of even wet harvest products around the starting roller 32 is avoided by the presence of the said scraper.

The scraper provided according to the invention may extend continuously over the entire width of the press or may instead be constituted by separate elements or by teeth which are arranged closely alongside one another. In the case of a continuous scraper, an operating crank is preferably provided on each side of the press.

It will be seen that the invention thus cures the disadvantages referred to and makes it possible to obtain a correct starting of the formation of a bale inside the chamber of the press, whatever may be the conditions of the harvest products that are picked up.

We claim:

1. In a press for forming large cylindrical bales and including a plurality of belts supported on a plurality of rollers so as to define a chamber having an opening at its bottom, an upright forward portion defined by a first section of the plurality of belts which are driven in a direction toward the opening by a driven one of the rollers located at the front of the opening and an upright rearward portion defined by another section of the plurality of belts which is supported by another one of the rollers located at the rear of the opening and is driven in a direction away from the opening, a pickup located for gathering crop material from the ground and transferring it through the opening in a zone adjacent the rearward portion of the opening, and a starting roller located in the opening adjacent to the driven one of the rollers and driven in a direction which is the same as that in which the driven one of the rollers is driven, the improvement comprising: a scraper mounted forwardly of and adjacent to said starting roller and having an end located in the immediate vicinity of the periphery of the starting roller; and a plurality of fingers mounted at a location above the driven one of the support rollers and respectively projecting between the belts at the first section of the plurality of belts and having ends disposed in continuous adjacent relationship to an upper peripheral portion of the starting roller, whereby the fingers serve to deflect material carried by the first section of the plurality of belts rearwardly toward the upper periphery of the starting roller so as to augment the action of the starting roller in forming a bale and to consequently augment the action of the scraper in preventing crop material from wrapping around the starting roller.

2. The press according to claim 1 wherein an angle iron extends parallel to said driven one of the rollers at a side of said first section of the plurality of belts remote from the starting roller; each of the fingers being provided, at an end remote from said driven one of the rollers, with an end section which extends approximately perpendicular from the remainder of the finger and is pivotally mounted in one leg of said angle iron for moving from side to side between said belts; and said angle iron having slots in a second leg receiving the fingers for limiting their sideways movement.

3. The press according to claim 1 wherein said roller is of noncircular section; said scraper being pivotally mounted and means holding the scraper in contact with said roller.

4. The press according to claim 3 wherein said scraper is in the form of a two-armed lever, with one arm extending to the starting roller and with another arm extending away from the starting roller from the pivotal mounting of the scraper; said means holding being in the form of a driving mechanism including a crank arm; a lost motion slot formed in said other arm of the scraper and receiving an end of said crank arm, whereby the crank arm is adapted for driving the scraper in synchronism with the rotation of said starting roller.

5. In a press for forming large cylindrical bales and including a set of belts defining a chamber for rolling up crop material to form a bale, a pickup located for gathering crop material from the ground and transferring it to an opening leading to said chamber and said starting roller located on a side of said opening remote from said pickup, the improvement comprising: a scraper mounted adjacent said starting roller and having an end located adjacent the surface of the roller for deterring crop material from rolling up on said rollers; a plurality of fingers projecting between the belts and having respective ends terminating adjacent said starting roller; said fingers being located above and said scraper being located below said roller; and an angle iron extending parallel to said roller at a side of said set of belts remote from the roller; each of the fingers being provided, at an end remote from said roller, with an end section which extends approximately perpendicular from the remainder of the finger and is pivotally mounted in one leg of said angle iron for moving from side to side between said belts; and said angle iron having slots in a second leg receiving the fingers for limiting their sideways movement.

6. In a press for forming large cylindrical bales and including a set of belts defining a chamber for rolling up crop material to form a bale, a pickup located for gathering crop material from the ground and transferring it to an opening leading to said chamber and a starting roller located on a side of said opening remote from said pickup, the improvement comprising: a scraper mounted adjacent said starting roller and having an end located adjacent the surface of the roller for deterring crop material from the rolling up on said roller; said roller being of noncircular section; said scraper being pivotally mounted and in the form of a two-armed lever, with one arm extending to the roller and with another arm extending away from the roller from the pivotal mounting of the scraper; and means holding the scraper in contact with said roller and being in the form of a driving mechanism including a crank arm; a lost motion slot formed in said other arm of the scraper and receiving an end of said crank arm, whereby the crank arm is adapted for driving the scraper in synchronism with the rotation of said starting roller.

* * * * *